(12) United States Patent
Asamizu

(10) Patent No.: US 8,277,066 B2
(45) Date of Patent: Oct. 2, 2012

(54) LIGHTING DEVICE FOR DISPLAY DEVICE, DISPLAY DEVICE AND TELEVISION RECEIVER

(75) Inventor: Tomohiro Asamizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 323 days.

(21) Appl. No.: 12/681,638

(22) PCT Filed: Jul. 18, 2008

(86) PCT No.: PCT/JP2008/063017
§ 371 (c)(1),
(2), (4) Date: Apr. 5, 2010

(87) PCT Pub. No.: WO2009/050928
PCT Pub. Date: Apr. 23, 2009

(65) Prior Publication Data
US 2010/0277404 A1   Nov. 4, 2010

(30) Foreign Application Priority Data
Oct. 17, 2007   (JP) ................................ 2007-270195

(51) Int. Cl.
*G09F 13/04* (2006.01)
(52) U.S. Cl. ..................................................... 362/97.1
(58) Field of Classification Search .................. 362/97.1, 362/97.2
See application file for complete search history.

(56) References Cited

U.S. PATENT DOCUMENTS

| 2002/0086573 | A1 | 7/2002 | You | |
|---|---|---|---|---|
| 2005/0093419 | A1 | 5/2005 | You | |
| 2005/0226002 | A1* | 10/2005 | Aoki et al. | 362/581 |
| 2006/0208641 | A1* | 9/2006 | Maniwa et al. | 313/623 |
| 2007/0047264 | A1 | 3/2007 | Joo et al. | |
| 2007/0058376 | A1* | 3/2007 | Suzuki | 362/368 |
| 2007/0153496 | A1* | 7/2007 | Chang et al. | 362/97 |

FOREIGN PATENT DOCUMENTS

| JP | 2002-303868 A | 10/2002 |
|---|---|---|
| JP | 2003-178718 A | 6/2003 |
| JP | 2007-059406 A | 3/2007 |
| JP | 2007-157564 A | 6/2007 |

OTHER PUBLICATIONS

Official Communication issued in International Patent Application No. PCT/JP2008/063017, mailed on Aug. 19, 2008.

* cited by examiner

*Primary Examiner* — Julie Shallenberger
(74) *Attorney, Agent, or Firm* — Keating & Bennett, LLP

(57) ABSTRACT

A lighting device 12 for a display device of the present invention includes tubular light sources 17 provided in a parallel arrangement and covering members 20 that covers respective ends of the tubular light sources 17. Electrodes 41 are provided at ends of the tubular light sources 17. Electrical terminals 24 for electrically connecting to the electrodes 41 are assembled to the covering members 20. Namely, the covering members 20 have an electrical connection function for connecting the tubular light sources 17 to an external power source in addition to a covering function that is its primary function for covering the ends of the tubular light sources 17 so that they are not viewed. With this configuration, efficiency of the assembly work can be improved and reliable power supply to the tubular light sources 17 can be provided.

10 Claims, 9 Drawing Sheets

LIGHTING DEVICE FOR DISPLAY DEVICE, DISPLAY DEVICE AND TELEVISION RECEIVER

TECHNICAL FIELD

The present invention relates to a lighting device for a display device, a display device and a television receiver.

BACKGROUND ART

In a display device using non-light emitting optical components, such as a liquid crystal display device, a backlight device is provided behind (i.e., on a side opposite from a display surface of) a display panel such as a liquid crystal display panel for illuminating the display panel. The backlight device includes a chassis having an opening on a liquid crystal panel side, a plurality of lamps (e.g., cold cathode tubes) and covering members for supporting ends of the lamps. The lamps emit light when a voltage is applied by an external power source (see Patent Document 1).

Patent Document 1 discloses a lamp device for a liquid crystal display device including a lamps, wires and a connector. The lamps emit light by using an external voltage applied at power source terminals for electric discharge. The wires deliver the voltage. The connector brings electrodes of the lamp into direct contact with a part of the wires and then the electrode of the lamps into electric contact with the wires.

Patent Document 1: Japanese Unexamined Patent Publication No. 2002-303868

Problem to be Solved by the Invention

According to the configuration of the Patent Document 1, a time-consuming assembly work is required because the connector needs to be connected to the lamp first and then to the wires (hereinafter referred also as harnesses). Moreover, the wires and the connector have direct contact and thus wire disconnection may not be prevented.

DISCLOSURE OF THE PRESENT INVENTION

The present invention was made in view of the foregoing circumstances. An object of the present invention is to provide a lighting device for a display device that is capable of providing reliable power supply to light sources with preferable assembly work efficiency. Another object of the present invention is to provide highly reliable display device and television receiver including such a lighting device for a display device.

Means for Solving the Problem

To solve the above problem, a lighting device for a display device of the present invention includes tubular light sources provided in a parallel arrangement and covering members that cover ends of the tubular light sources. Electrodes are provided at ends of the tubular light sources and electrical terminals for electrically connecting to the electrodes are assembled to the covering members.

With such a configuration, time for making connection between the electrical terminals and the electrodes included in the tubular light sources is reduced because the electrical terminals are assembled to the covering members. Furthermore, they can be reliably connected.

According to a known configuration, electrodes of tubular light sources are connected to harnesses extend from an external power source via a connector, for example, to supply power to the tubular light sources. The assembly work for the known configuration is time-consuming because the connector needs to be connected to the electrode first and then to harnesses. Furthermore, work for making the connection between the connector and the harnesses are usually done manually and thus the harnesses may be broken during the work.

According to the present invention, the electrical terminals are assembled to the covering members instead of using harnesses that extend from an external power source. Namely, the covering members have an electrical connection function that connects the tubular light sources to an external power source in addition to a covering function that is its primary function for covering the ends of the tubular light sources so that they are not viewed. With this configuration, the electrodes of the tubular light sources are connected to the electrical terminal of the covering members when work of covering the ends of the tubular light sources with the covering members is completed. As a result, power can be supplied to the tubular light sources. Time for making connection between them is reduced. Furthermore, because harnesses are not required for the connection, broken harnesses do not occur and thus reliable connection can be made.

BEST MODE FOR CARRYING OUT THE INVENTION

An embodiment of the present invention will be explained with reference to FIGS. 1 to 8. In this embodiment, a television receiver TV including a liquid crystal display device 10 will be explained.

Figure 1:
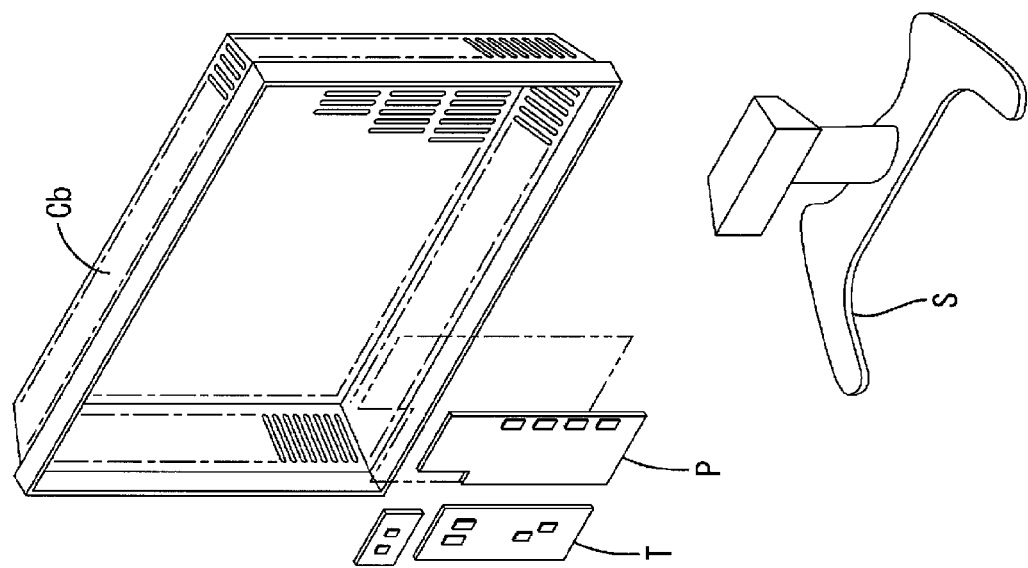
FIG. 1 is an exploded perspective view illustrating a general construction of a television receiver according to an embodiment of the present invention.
Figure 1:
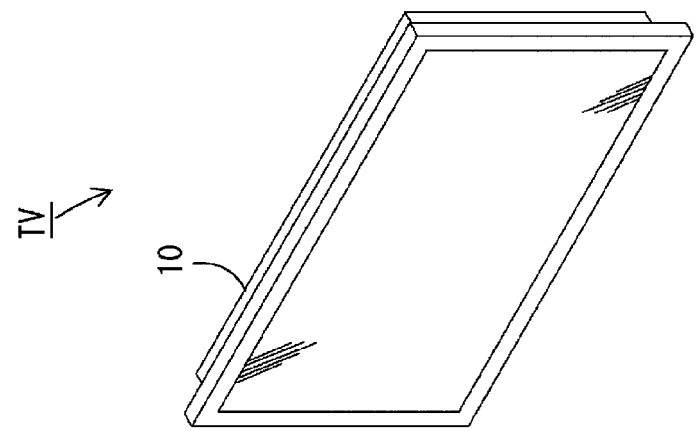
Figure 1:
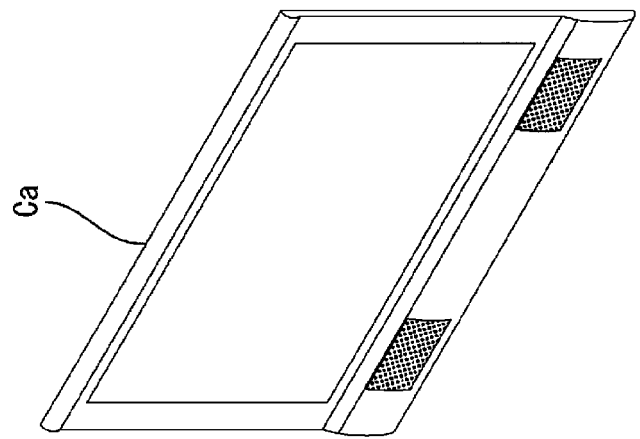
Figure 2:
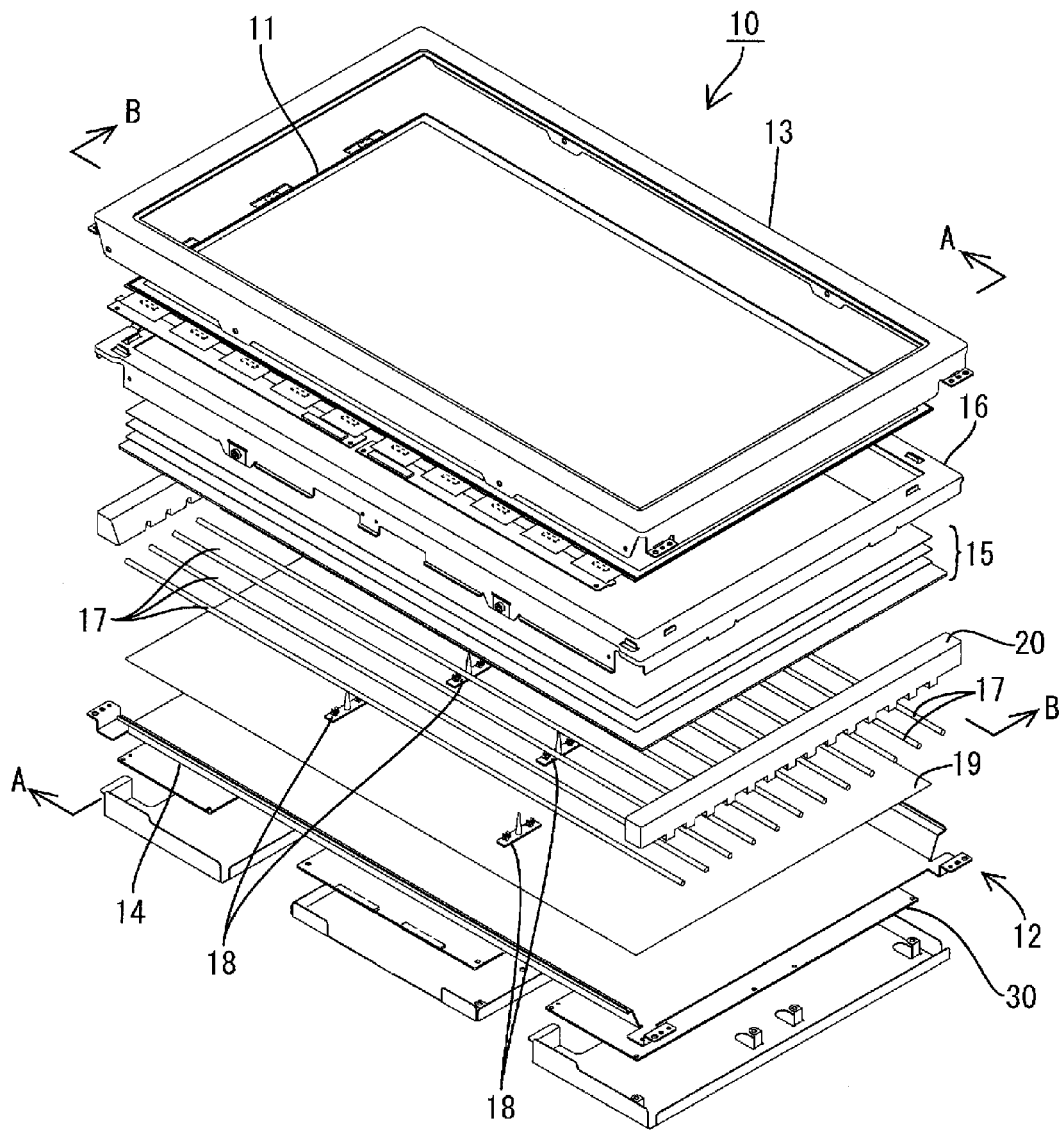
FIG. 2 is an exploded perspective view illustrating a general construction of a liquid crystal display device included in the television receiver in FIG. 1.
Figure 3:
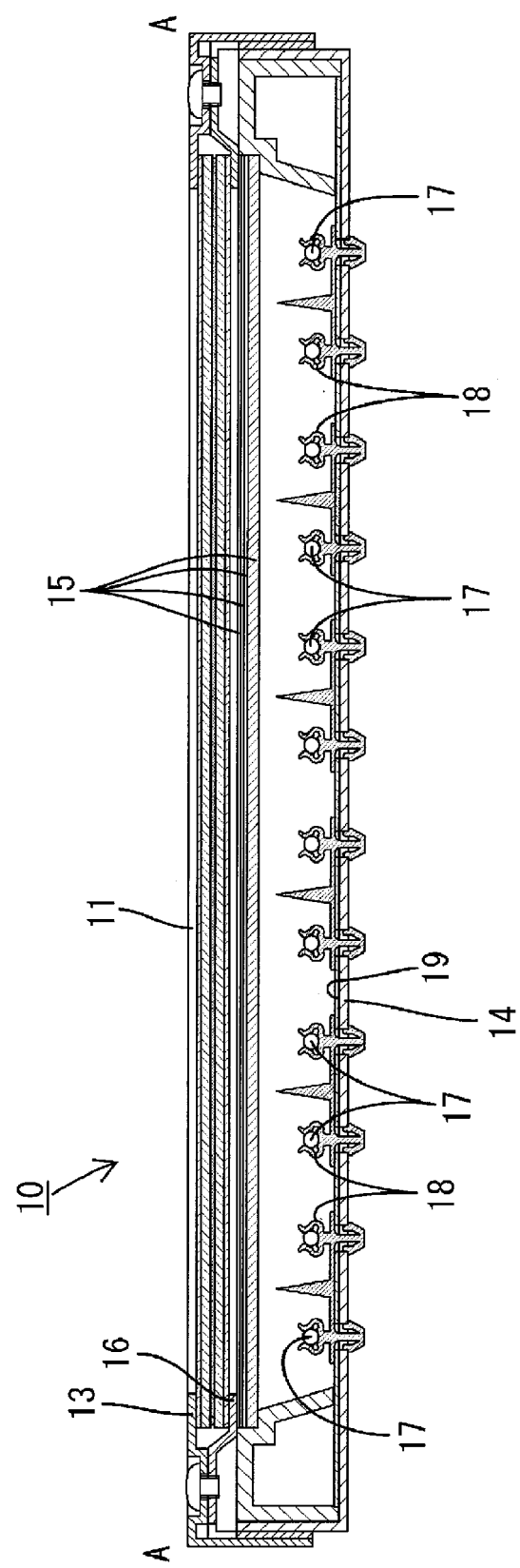
FIG. 3 is a cross-sectional view of the liquid crystal display device in FIG. 2 along the line A-A.
Figure 4:
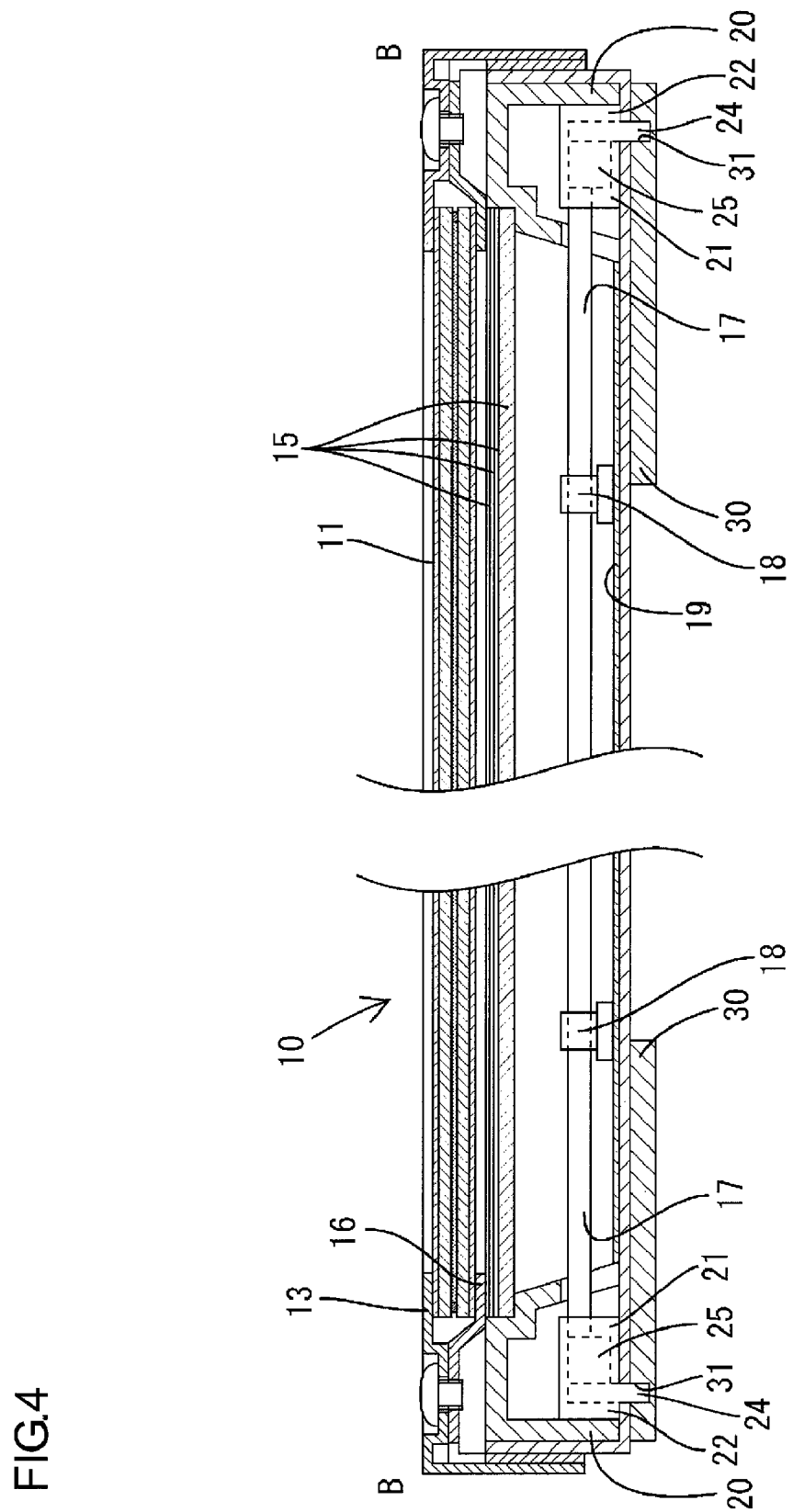
FIG. 4 is a cross-sectional view of the liquid crystal display device in FIG. 2 along the line B-B.
Figure 5:
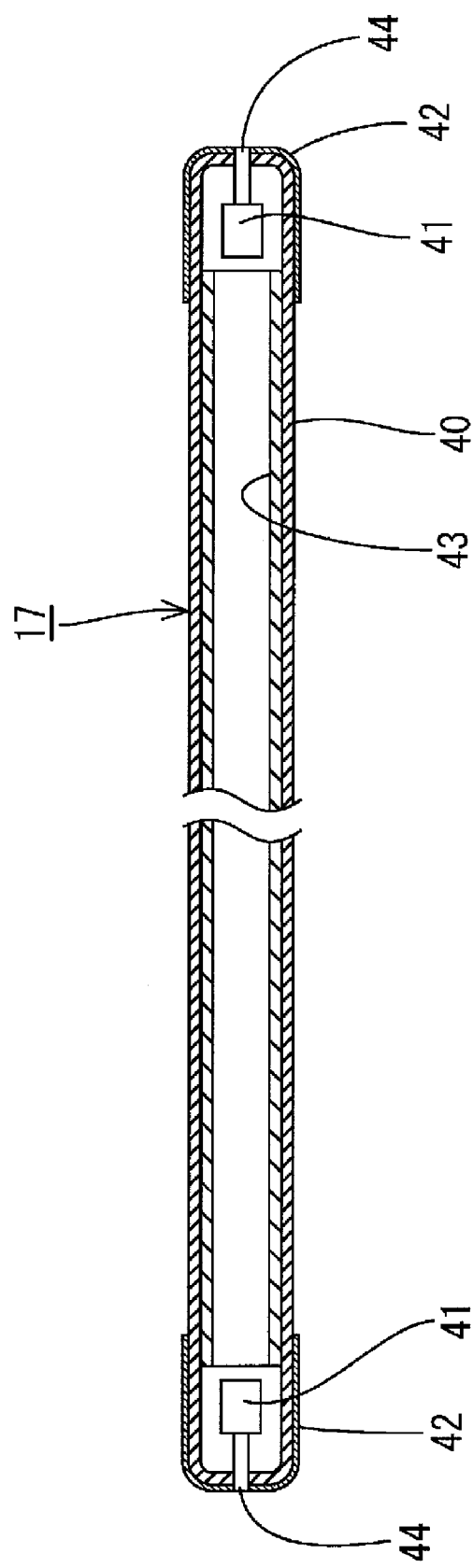
FIG. 5 is a cross-sectional view illustrating a general construction of a cold cathode tube included in the liquid crystal display device in FIG. 2.
Figure 6:
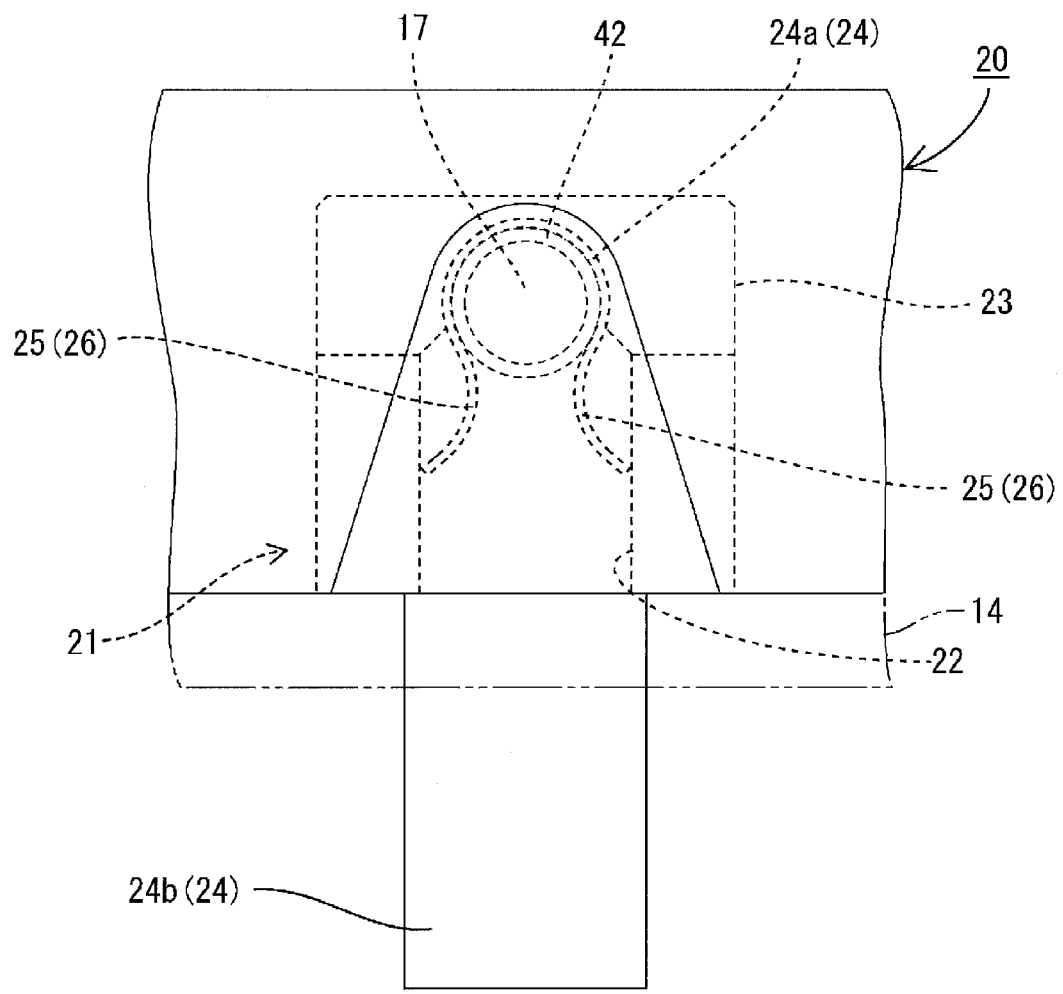
FIG. 6 is a front view illustrating a general construction of a lamp holder included in the liquid crystal display device in FIG. 2.
Figure 7:
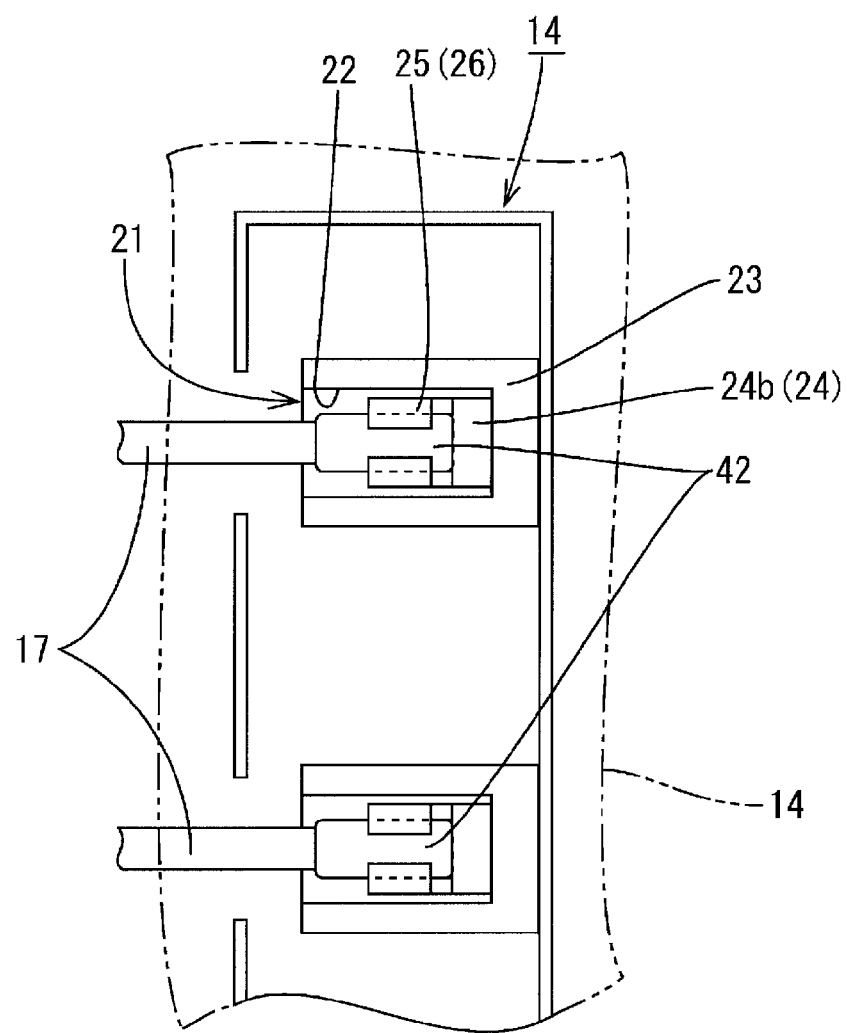
FIG. 7 is a plan view illustrating a general construction of the lamp holder in FIG. 6.
Figure 8:
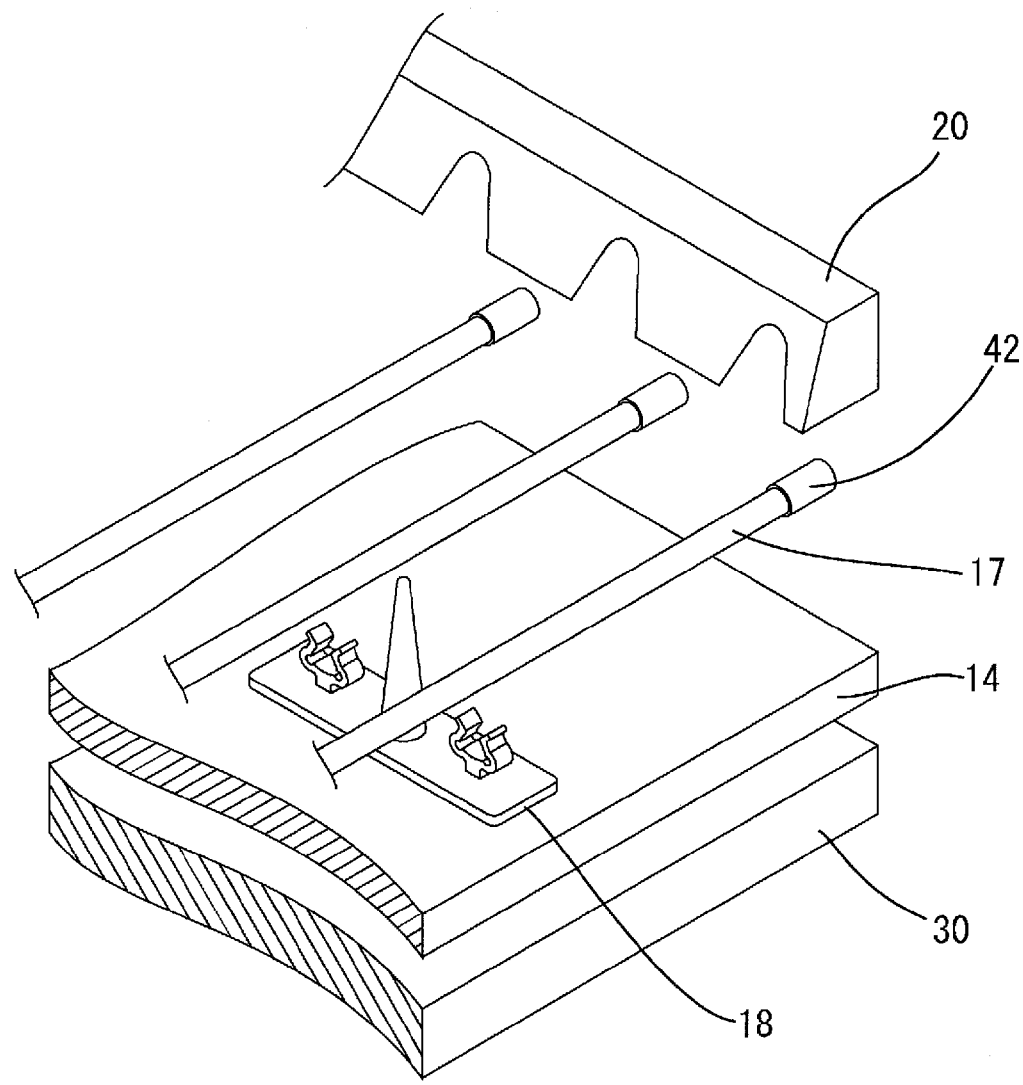
FIG. 8 is a schematic view illustrating an assembly work of the liquid crystal display device.

FIG. 1 is an exploded perspective view illustrating a general construction of the television receiver of this embodiment. FIG. 2 is an exploded perspective view illustrating a general construction of the liquid crystal display device. FIG. 3 is a cross-sectional view of the liquid crystal display device along the line A-A. FIG. 4 is a cross-sectional view of the liquid crystal display device along the line B-B. FIG. 5 is a cross-sectional view illustrating a general construction of a cold cathode tube included in the liquid crystal display device. FIG. 6 is a front view illustrating a general construction of a lamp holder included in the liquid crystal display device. FIG. 7 is a plan view illustrating a general construction of the lamp holder. FIG. 8 is a schematic view illustrating an assembly work of the liquid crystal display device.

As illustrated in FIG. 1, the television receiver TV of the present embodiment includes the liquid crystal display device 10, front and rear cabinets Ca, Cb that house the liquid crystal display device 10 therebetween, a power source P, a tuner T and a stand S. An overall shape of the liquid crystal display device (display device) 10 is a landscape rectangular. The liquid crystal display device 10 is housed in a vertical position such that a short-side direction thereof matches a vertical line. As illustrated in FIG. 2, it includes a liquid crystal panel 11, which is a display panel, and a backlight device 12, which is an external light source. They are integrally held by a bezel 13 and the like.

Next, the liquid crystal panel 11 and the backlight device 12 included in the liquid crystal display device 10 will be explained (see FIGS. 2 to 4).

The liquid crystal panel (display panel) 11 is configured such that a pair of glass substrates is bonded together with a predetermined gap therebetween and liquid crystal is sealed between the glass substrates. On one of the glass substrates, switching components (e.g., TFTs) connected to source lines and gate lines that are perpendicular to each other and pixel electrodes connected to the switching components are provided. On the other substrate, counter electrodes, color filter having color sections such as R, G and B color sections arranged in a predetermined pattern and the like are provided.

The backlight device (lighting device for a display device) 12 is a so-called direct backlight device in which a light source is arranged closely behind a panel surface (i.e., a display surface) of the liquid crystal panel 11. It includes a plurality of tubular light sources (cold cathode tubes (tubular light sources) 17 are used as high-pressure discharge tubes here) along the panel surface.

The backlight device 12 further includes a chassis 14, a plurality of optical members 15 (a diffuser plate, a diffusing sheet, a lens sheet and a reflection type polarizing plate, arranged in this order from the lower side of the drawings) and a frame 16. The chassis 14 has a substantially box-shape and an opening on the top. The optical members 15 are arranged so as to cover the opening of the chassis 14. The frame 16 holds the optical members 15 to the chassis 14. The cold cathode tubes 17, lamp holders 20 that cover ends of the cold cathode tubes 17 collectively, and lamp clips 18 for mounting the cold cathode tubes 17 to the chassis 14 are installed in the chassis 14. A light emitting side of the backlight device 12 is a side closer to the optical member 15 than the cold cathode tube 17.

The chassis 14 is made of a metal. It is formed in a shallow box shape having a rectangular bottom plate and side walls that stand upright from the sides of the bottom plate. A light reflecting sheet 19 is disposed on a side opposite from the light emitting side of the cold cathode tubes 17 (i.e., on an inner surface of the bottom plate of the chassis 14) so as to form a light reflecting surface.

The light reflecting sheet 19 is a resin sheet having a surface in white that provides high light reflectivity. As illustrated in FIG. 3, it is placed so as to cover almost entire inner surface of the chassis 14. It is integrated with the chassis 14 so as to form a surface of the chassis 14. With this light reflecting sheet 19, light emitted from the cold cathode tubes 17 is reflected toward the light reflecting members 15 including the diffuser plate.

Inverter boards 30 are mounted in longitudinal end areas of the chassis 14 on a surface opposite from a side on which the cold cathode tubes 17 and the light reflecting sheet 19 are arranged (i.e., on an outer surface of the bottom plate of the chassis 14). Each inverter board 30 includes circuit components (not shown) such as a transformer that generates a high frequency voltage as driving power for the cold cathode tubes 17. It has a function to supply power from a receiving electrode section 31 that is connected to the circuit components to the cold cathode tubes 17 (see FIG. 4).

Each cold cathode tube 17 has an elongated tubular shape. A plurality of them (twelve tubes in FIG. 2) are housed in the chassis 14 such that the longitudinal direction (i.e., the axial direction) thereof matches the longitudinal direction of the chassis 14. As illustrated in FIG. 5, it includes an elongated glass tube 40 with ends thereof are sealed and electrodes 41 arranged inside the glass tube 14 at ends thereof. It further includes ferrules 42 fitted to respective peripheries of the ends of the glass tube 40. Moreover, mercury is enclosed inside the glass tube 40 and a fluorescent material 43 is applied inner surface of the glass tube 40. A part of each end of the cold cathode tube 17 covered by the ferrule 42 is a non-light-emitting section and middle part (where the fluorescent material 43 is applied) is a light-emitting section.

The electrodes 41 and the ferrules 42 included in the cold cathode tubes 17 are made of a metal material having electrical conductivity. An outer lead 44 extends from each electrode 41 to an outside of the glass tube 40. By connecting the outer lead 44 to the electrode 41, the electrode 41 and the ferrule 42 are electrically connected.

Lamp holders 20 are arranged at longitudinal ends of the chassis 14 along a short-side direction of the chassis 14 (a parallel arrangement direction of the cold cathode tubes 17) so as to collectively cover the ends of the cold cathode tubes 17 (see FIG. 2). A light reflective agent is applied to surfaces of the lamp holders 20 and thus an overall color of the surfaces look white. Each lamp holder 20 has holding portions 21 formed in locations corresponding to ends of the cold cathode tubes 17 arranged in parallel for holding the cold cathode tubes 17. The lamp holders 20 cover the ends of the cold cathode tubes 17 when they are inserted in the holding portions 21.

As illustrated in FIGS. 6 and 7, each holding portion 21 has an opening 22 from a lower end (on a side facing the chassis 14) to one of sides (in a surface facing the other lamp holder 20 arranged on the other longitudinal end of the chassis 14). The end of the cold cathode tube 17 is inserted from the opening 22. FIG. 7 is a view of the holding portion 21 from the chassis 14 side illustrating a general construction of the holding portion 21.

Each holding portion 21 includes an electrical terminal 24 made of a metal material and used for electrical connection, and a holding body 23 that covers the electrical terminal 24. One part of the electrical terminal 24 is located on an upper side of the holding portion 21 (an upper side in FIG. 6). The part is configured as a light source connection terminal 24a for electrically connecting to the cold cathode tube 17. The other part of the electrical terminal 24 extends along one of the side surfaces of the holding body 23. This part is configured as a board connection terminal 24b for electrically connecting to the inverter board 30.

The light source connection terminal 24a has a round C shape that opens toward the lower side so as to hold a part of the periphery of the ferrule 42 included in the cold cathode tube 17 and to allow attachment and removal of the cold cathode tube 17. A width of a gap of the light source connection terminal 24a is smaller than that of the cold cathode tube 17, and a catch portion 25 is provided at open ends of the light source connection terminal 24a. The catch portion 25 supports the cold cathode tube 17 from the lower side (the chassis 14 side) so as to fix the cold cathode tube to the holding portion 21. Especially in this embodiment, the catch portion 25 includes a pair of plate springs 26 (elastic members) that curve convexly with respect to open ends. The catch portion 25 is provided with a function for allowing the attachment and removal of the cold cathode tube 17 with elastic deformation.

The board connection terminal 24b has a plate shape and extends along the side surface of the holding body 23 that is opposite the opening (the side surface located closer to the edge of the chassis 14). It protrudes from the bottom of the holding portion 21. The board connection terminal 24b penetrates through the chassis 14 and projects to the side opposite from the side on which the lamp holder 20 is disposed. Then, it is fitted to the receiving electrode section 31 of the inverter board 30 (see FIG. 4). When the board connection terminal 24b is fitted to the receiving electrode section 31, the electrical terminal 24 is electrically connected to the inverter board 30.

Next, an assembly procedure of the backlight device 12 will be explained with reference to FIG. 8.

First, the lamp clips 18 are fitted in predetermined locations of the chassis 14 and the cold cathode tubes 17 are fixed in the lamp clips 18. In this embodiment, two cold cathode tubes 17 are attached to one lamp clip 18. Then, the lamp holders 20 are positioned over the ends (where the ferrules 42 are located) of the cold cathode tubes 17 arranged in parallel, and the lamp holders 20 are attached to the chassis 14. When the lamp holders 20 are attached, the ends of the cold cathode tubes 17 are inserted in the holding portions 21 of the lamp holders 20, and each ferrule 42 is connected to apart of the electrical terminal 24 (the light source connection terminal 24a). The other part of the electrical terminal 24 (the board connection terminals 24b) protrudes from the surface on the side opposite from the side on which the cold cathode tubes 17 are arranged (i.e. the outer surface of the bottom plate of the chassis 14). Finally, the inverter boards 30 are mounted to the outer surface of the bottom plate of the chassis 14. When the inverter boards 30 are mounted, the electrical terminals 24 (the board connection terminals 24b) are inserted in the receiving electrode sections 31 of the inverter boards 30, and the electrical terminals 24 are connected with the inverter boards 30. As a result, the cold cathode tubes 17 are electrically connected to the inverter boards 30 via the electrical terminals 24, and driving power is supplied from the inverter circuits 30 to the cold cathode tubes 17.

A different assembly procedure may be used.

First, the ends of the cold cathode tubes 17 are inserted in the holding portions 21 of the lamp holders 20. As a result, the cold cathode tubes 17 and the lamp holders 20 that cover the ends of the cold cathode tubes 17 are assembled into a single unit. The lamp clips 18 are attached to the chassis 14. Then, the cold cathode tubes 17 and the lamp holders 20 that are assembled into a single unit are attached to the chassis 14 and finally the inverter boards 30 are mounted to the chassis 14. According to this assembly procedure, different steps can be performed in parallel.

As explained above, the backlight device 12 of the present embodiment includes the cold cathode tubes 17 and the lamp holders 20 that collectively cover the ends of the cold cathode tubes 17. The lamp holders 20 include the electrical terminals 24 for electrically connecting to the electrodes 41 provided at both ends of the cold cathode tubes 17.

The known electrical connection configuration requires the electrodes, connector and harnesses. On the other hand, the backlight device 12 has an electrical connection configuration that only requires the cold cathode tubes 17 and the electrical terminals 24 assembled to the lamp holders 20. Therefore, connection can be easily and reliably made.

The assembly work for the known configuration is time-consuming because the connector needs to be connected to the electrode first and then to harnesses. Furthermore, the connection between the connector and the harnesses are usually done manually and thus the harnesses may be broken during the work.

According to the present invention, the electrical terminals 24 are assembled to the lamp holders 20. Namely, the lamp holders 20 have an electrical connection function that connects the cold cathode tubes 17 to an external power source in addition to a covering function that is primary function thereof for covering the ends of the cold cathode tubes 17 so that they are not viewed. With this configuration, the electrodes 41 of the cold cathode tubes 17 are electrically connected to the electrical terminals 24 of the lamp holders 20 and power can be supplied to the cold cathode tubes 17 when the assembly work to cover the ends of the cold cathode tubes 17 with the lamp holders 20 is completed. Namely, making connection between them is easily done. This configuration does not require harnesses to connect them. Therefore, a problem such as broken harnesses does not occur and thus reliable connection can be made.

In this embodiment, the ferrules 42 are fitted to the ends of the cold cathode tubes 17 and the electrodes 41 are electrically connected to the electrical terminals 24 via the ferrules 42.

Instead of using the harnesses in the known configuration, the ferrules 42 fitted to the cold cathode tubes 17 are used for electrical connection with the electrodes 41. Each cold cathode tube 17 and the respective ferrules 42 are provided as a single unit and thus time for the assembly work is not reduced.

In this embodiment, each electrical terminal 24 has the round C shape so as to hold a part of the periphery of the ferrule 42.

With this configuration, the electrode 41 of the cold cathode tube 17 is electrically connected to the electrical terminal 24 with simple work, that is, fitting the ferrule 41 included in the cold cathode tube 17 to the electrical terminal 24 having the round C shape. Therefore, time for connecting them is reduced.

In this embodiment, each lamp holder 20 has the holding portions 21 for holding the cold cathode tubes 17. Each holding portion 21 has the opening 22 that opens toward the chassis 14. The end of the cold cathode tube 17 is inserted from the opening 22.

With this configuration, time for inserting the cold cathode tubes 17 in the lamp holders 20 can be reduced. Specifically, to attach the lamp holders 20 to the chassis 14, the lamp holders 20 are brought closely to the chassis 14 while the openings 22 of the holding portions 21 are positioned over the cold cathode tubes 17. When they are lowered, the ends of the cold cathode tubes 17 are inserted in the holding portions 21. Namely, work for attaching the lamp holders 20 to the chassis 14 and work for inserting the cold cathode tubes 17 in the lamp holders 20 can be done at the same time. Therefore, efficiency of the assembly work can be improved.

In this embodiment, each holding portion 21 has the catch portion 25 so that the cold cathode tube 17 can be supported from the chassis 14 side.

Even when force to displace is applied to the cold cathode tube 17 that is placed properly in the holding portion 21 due to vibrations and the like, the cold cathode tube 17 is supported with the catch portion 25 from the chassis 14 side (i.e., the opening 22 side). Therefore, the cold cathode tube 17 is less likely to come off.

Especially in this embodiment, the catch portion 25 is constructed of the elastic members 26 and allows attachment and removable of the cold cathode tube 17 with elastic deformation of the elastic members 26.

With this configuration, when the cold cathode tube 17 is being inserted in the holding portion 21, the catch portion 25 is elastically deformed while the cold cathode tube 17 presses against the lamp holder 20. As a result, a gap that is large enough for the cold cathode tube 17 to pass through is created. When the cold cathode tube 17 is being removed from the holding portion 21, force large enough to cause elastic deformation is applied to the catch portion 25. However, force applied to the catch portion 25 due to vibration and the like does not cause the elastic deformation. Therefore, the cold cathode tube 17 is less likely to come off unexpectedly.

In this embodiment, the light source connection terminal 24a, which is a part of the electrical terminal 24, is connected to the cold cathode tube 17. Moreover, the board connection terminal 24b, which is the other part of the electrical terminal 24, protrudes from the surface of the chassis 17 opposite from the surface on which the cold cathode tube 17 is arranged. It is electrically connected to the inverter board 30.

With this configuration, the cold cathode tube 17 and the inverter board 30 are electrically connected with each other only via the electrical terminal 24. Namely, the backlight device 12 can supply power from the inverter board 30 to the cold cathode tube 17 without the harnesses as in the known configuration. Therefore, a broken harness problem does not occur during the assembly work.

In this embodiment, the lamp holders 20 are provided in white.

By providing the lamp holders 20 in white, it is more likely to reflect light and thus the brightness in the areas around the ends of the cold cathode tubes 17, that is, the edge areas of the backlight device 12 is less likely to decrease.

Especially in this embodiment, the light reflective agent is applied to the surfaces of the lamp holders 20.

The lamp holders 20 are even more likely to reflect light and thus the brightness in the edge areas of the backlight device 12 is even less likely to decrease.

OTHER EMBODIMENTS

The present invention is not limited to the above embodiments explained in the above description. The following embodiments may be included in the technical scope of the present invention, for example.

Figure 9:
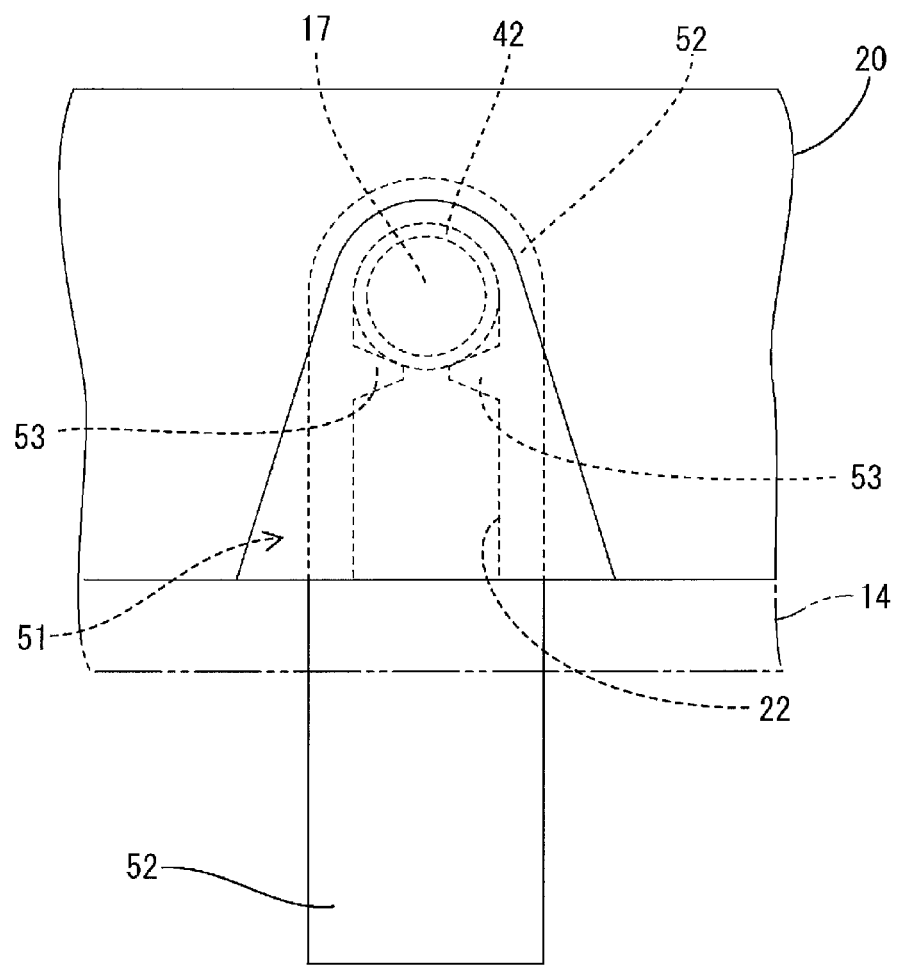
FIG. 9 is a front view illustrating a modification of the lamp holder.

(1) In the above embodiment, each holding portion 21 includes the holding body 23 and the electrical terminal 24. However, a holding portion 51 that only includes an electrical terminal 52 may be used. Further, as illustrated in FIG. 9, a catch portion 53 may be formed with metal plates protruding from inner side walls of the holding portion 51 that only includes the electrical terminal 52.

(2) In the above embodiment, each electrode 41 is electrically connected to the electrical terminal 24 via the ferrule 42. However, the electrode 41 may be connected to the outer lead 44 that extends from the electrode 41 without using a ferrule.

(3) In the above embodiment, the cold cathode tubes 17 are used as light sources. However, other types of light sources including hot cathode tubes can be used.

(4) In the above embodiment, the TFTs are used as switching components of the liquid crystal display device 10. However, the present invention can be applied to liquid crystal devices that use switching components other than the TFTs (e.g., thin film diodes (TFDs)). It also can be applied to a black and white liquid crystal display device other than the color liquid crystal display device.

(5) In the above embodiment, the liquid crystal display device 10 using the liquid crystal panel 11 as a display panel. However, the present invention can be applied to display devices using different types of display panels.

The invention claimed is:

1. A lighting device for a display device comprising:
   light sources provided in a parallel arrangement;
   covering members configured to cover respective ends of said light sources;
   a chassis to which said light sources and said covering members are mounted; and
   an inverter board disposed on said chassis on a side opposite from a side on which said light sources are arranged, wherein:
   said light sources include electrodes at ends thereof;
   said covering members include electrical terminals arranged to make electrical connection with said electrodes;
   each of said light sources includes ferrules fitted to the ends thereof;
   said ferrules are electrically connected to said electrodes;
   said electrodes are electrically connected to said electrical terminals via the ferrules;
   each of said covering members includes a plurality of integrally provided holding portions and each of the holding portions is configured to hold one of the respective ends of said light sources, the electrical terminals being integrally provided to each of the holding portions;
   each of said holding portions includes an opening that opens toward said chassis and said light sources are inserted from the openings;
   each of said electrical terminals includes a portion that is located opposite from a portion that is connected to said light sources, that penetrates through said chassis to the side of the chassis on which the inverter board is disposed, and that is electrically connected to the inverter board; and
   an end of each of the electrical terminals is directly connected to the inverter board without having any wires therebetween.

2. The lighting device for a display device according to claim 1, wherein
   said light sources are tubular light sources;
   said ferrules have a substantially cylindrical shape so as to be fitted to said tubular light sources; and
   said electrical terminals have a round C shape so as to hold peripheries of said ferrules.

3. The lighting device for a display device according to claim 1, wherein said holding portions include catch portions configured to support said light sources from a chassis side.

4. The lighting device for a display device according to claim 3, wherein said catch portions are constructed of elastic members and allow attachment and removal of said light sources with elastic deformation of the elastic members.

5. The lighting device for a display device according to claim 1, wherein said covering members have white surfaces.

6. The lighting device for a display device according to claim 1, wherein said covering members have surfaces to which a light reflective agent is applied.

7. A display device comprising:
   a lighting device according to claim 1; and
   a display panel configured to provide display using light from said lighting device for a display device.

8. The display device according to claim 7, wherein the said display panel is a liquid crystal display panel using liquid crystal.

9. A television receiver comprising the display device according to claim 7.

10. The lighting device for a display device according to claim 1, wherein the inverter board includes a receiving electrode section to which the electrical terminals are fitted and the ends of the electrical terminals are fitted to the receiving electrode section to be electrically connected to the inverter board.

\* \* \* \* \*